(12) United States Patent
Wei et al.

(10) Patent No.: US 7,749,936 B2
(45) Date of Patent: Jul. 6, 2010

(54) SUPPORTED AMORPHOUS NI-B ALLOY CATALYST, ITS PREPARATION AND USE

(76) Inventors: Li Wei, 94 Wei Jin Road, Nankai District, Tianjin (CN); Bian Junmin, Floor1, Building F1, No. 80, 4th street, TEDA, Tianjin (CN); Zhang Minghui, 94 Wei Jin Road, Nankai District, Tianjin (CN); Han Chong, 94 Wei Jin Road, Nankai District, Tianjin (CN); Tao Keyi, 94 Wei Jin Road, Nankai District, Tianjin (CN)

( * ) Notice: Subject to any disclaimer, the term of this patent is extended or adjusted under 35 U.S.C. 154(b) by 308 days.

(21) Appl. No.: 11/550,084

(22) Filed: Oct. 17, 2006

(65) Prior Publication Data

US 2008/0009640 A1    Jan. 10, 2008

(30) Foreign Application Priority Data

Oct. 24, 2005    (CN) .......................... 2005 1 0015580

(51) Int. Cl.
*B01J 21/02* (2006.01)
(52) U.S. Cl. ................ 502/204; 502/206; 502/207; 549/87
(58) Field of Classification Search ............... 502/204, 502/206, 207; 549/87
See application file for complete search history.

(56) References Cited

U.S. PATENT DOCUMENTS 3,440,181 A * 4/1969 Olstowski .................. 252/503
4,188,327 A * 2/1980 Kubicek ..................... 549/87
6,051,528 A * 4/2000 Ma et al. .................... 502/207

OTHER PUBLICATIONS

Wang et. al. "The interactions between the NiB amorphous alloy and TiO2 support in the NiB/TiO2 amorphous catalysts" Applied Catalysis A: General 2004, 259, 185-190 (Mar. 15, 2004).*
Kuznetsov et. al. "Texture and Catalytic Properties of Palladium Supported on Thermally Expanded Natural Graphite" Reaction Kinetics and Catalysis Letters 2003, vol. 80, No. 2, 345-350.*

* cited by examiner

*Primary Examiner*—Janet L Andres
*Assistant Examiner*—David E Gallis
(74) *Attorney, Agent, or Firm*—George G. Wang; Bei & Ocean

(57) ABSTRACT

A supported amorphous alloy catalyst, which is supported on a macroporous carrier-expanded graphite. The catalyst contains a Ni—B amorphous alloy (5 to 50% by weight) and a transition inductive metal (0.1 to 10% by weight). The diameter of expanded graphite carrier particles is 80-800 μm. Its BET specific surface area is 10-100 $m^2$/g. The catalyst is prepared by metal inductive electroless powder plating method which is easy to apply to industrial production. Ni—B clusters of prepared catalyst are well dispersed on the support. The catalyst shows high catalytic activity and good mechanical property, and is safe to use with low manufacturing costs.

18 Claims, 4 Drawing Sheets

SUPPORTED AMORPHOUS NI-B ALLOY CATALYST, ITS PREPARATION AND USE

CROSS REFERENCE TO RELATED APPLICATIONS

This application claims priority to Chinese Patent Application No. 200510015580.2, filed Oct. 24, 2005, the contents of which are hereby incorporated by reference.

FIELD OF THE INVENTION

The present invention relates to preparation of a supported amorphous alloy catalyst. Particularly, it relates to the preparation of a Ni—B amorphous alloy catalyst supported on the expanded graphite, and to the application of such catalyst in the hydrogenation process of sulfolene (2,5-Dihydrothiophene 1,1-dioxide).

BACKGROUND OF THE INVENTION

The amorphous alloy is a type of material characterized by its atomic structure arrangement being ordered in the short range while disordered in the long ranger. Duwez et al. first prepared an amorphous alloy by a rapid quenching method in 1960. Subsequently, a chemical reduction method, more economical and easier to manufacture, was developed, which can be used to prepare ultra-fine amorphous alloy particles. Amorphous alloys have received much attention from catalysis researchers since 1980 when Smith first reported the use of the amorphous alloy as a catalyst at the 7th International Congress on Catalysis.

Generally, there were two methods to prepare amorphous alloy catalysts: the rapid quenching method and the chemical reduction method. The amorphous alloy prepared by the rapid quenching method has a higher catalytic activity compared with Raney Ni catalyst, a standard method widely used in industry. However, the alloy prepared with the rapid quenching method has to be activated before it can be used as a catalyst. This activation process produces a large amount of bi-products causing environmental pollution problems, and consumes a large amount of energy due to the need to first melt the alloy. Furthermore, the rapid quenching method cannot be used to prepare amorphous alloy catalysts supported on a carrier. On the other hand, the chemical reduction method, although capable of producing amorphous alloys with a high specific surface area (the ratio of surface area to mass, $m^2/g$), is expensive and the resulting alloys are not very thermally stable. In the addition, the process is difficult to control and so is the quality of the resulting products. These drawbacks have limited both methods' industrial applications. To overcome these problems we have introduced a new preparation method—metal inductive electroless powder plating (see Chinese Patent No.:CN1546229). Using this method, amorphous alloys and supported amorphous alloy catalyst can be easily prepared under mild conditions.

Recently, supported amorphous alloys have attracted more and more attentions, because supported amorphous catalysts have better potential of industrial applications due to their higher specific surface area, higher thermal stability, superior catalytic properties and lower cost. As a more environment friendly catalyst, the supported amorphous alloy catalyst is considered a promising substitute for Raney Ni. However, the current supported amorphous alloy catalysts have problems because it is difficult to separate them from the reaction system in some liquid phase reaction while Raney Ni catalyst can be separated easily and quickly under the same circumstances due to its larger density. This problem has seriously hampered its industrial application. In order to solve this separation problem, the applicant tried to support amorphous alloy catalyst with heavy magnesia (see Petrochemical Technology, 2005, 34, 523) and achieved some success. Heavy magnesia, however, is not an ideal support due to its low specific surface area (about $2\ m^2/g$) and instability in water where it may be easily converted to magnesium hydroxide. Thus it remained a challenge to develop a suitable support that can overcome this problem and other problems while retaining the advantages of the supported amorphous alloy catalyst.

Expanded graphite (EG) is an intermediate product in producing flexible graphite. In industrial production, the natural flake graphite is treated with sulfuric acid and a small amount of oxidant to prepare the graphite intercalation compound. The intercalation compound is then washed and dried to obtain the expandable graphite. Heating the expandable graphite at high temperatures induces vaporization of the intercalated substances, so that a significant expansion of the material along the crystallographic c-axis occurs. The porous expanded graphite is thus obtained.

EG has been widely used in gasketing, adsorption, electromagnetic interference shielding, vibration damping, electrochemical applications, stress sensing and thermal insulator because of its chemical inertness, thermal stability, electrical conductivity, thermal insulation, innocuity, flexibility, self-viscosity and perfect quality of lubricate etc. Recently there are some reports on the use of expandable graphite as catalyst (YingChun Zhou et al., Chemical Production and Technology, 2003, 10, 21), because its high specific surface area can carry a large amount of acidic groups, whereby becoming a good replacement of the liquid acid catalyst. However, there was no information concerning the use of expanded graphite as a catalyst support until the report of B. N. Kuznetsov et al. in 2003 (React. Kinet. Catal. Lett., 2003, 80, 345). They prepared a series of palladium catalysts supported on three different expanded graphite materials made with different intercalating agents, tested the prepared catalysts in hydrogenation of cyclohexene, and analyzed the effect of different intercalating agents on the catalytic activity. In the same year, Jing Zhang (Mineral Resources and Geology, 2003, 17, 713) reported the preparation and surface property study of nonoparticles of EG-Metalcomplexe, which indicated the materials' potential application in the catalytic field.

In CN 1,073,726A, an alloy containing Al, rare earth elements (RE), P and Ni or Co or Fe was prepared by rapid quenching techniques. By alkaline leaching of Al from the alloy, using NaOH, a Ni/Co/Fe—RE—P amorphous alloy catalyst with high specific surface area of 50-130 $m^2/g$ was obtained. Its hydrogenation activity was greater than that of Raney Ni catalyst, a standard analyst widely used in industry.

An ultra-fine Ni—B amorphous alloy catalyst was reported in J. Catal. 150 (1994) 434-438. This catalyst was prepared by adding a 2.5 M aqueous $KBH_4$ solution dropwise at 25° C. to an alcoholic nickel acetate solution at a concentration of 0.1 M with stirring. The resulting Ni—B catalyst was then washed with 6 ml of 8 M $NH_3.H_2O$ and subsequently with a large amount of distilled water. However, ultra-fine Ni—B amorphous alloy particles obtained in this manner exhibited poor thermal stability, although their specific surface area could be as high as 29.7 $m^2/g$.

In U.S. Pat. No. 6,051,528, a supported amorphous Ni—P and Ni—B catalyst was prepared by a chemical reduction method. The catalyst contains 0.15-30% of Ni by weight, 0.03-10% of P by weight, 0.01-3.5% of B by weight. The nickel exists in the form of Ni—P or Ni—B amorphous alloy, the atomic ration Ni/P in the Ni—P amorphous alloy is in range of 0.5-10, and the atomic ratio Ni/B in the Ni—B amorphous alloy is in range of 0.5-10. The specific surface area of the catalyst could vary from 10 to 1000 m$^2$/g, preferably 100 to 1000 m$^2$/g, depending on the specific surface area of the carrier.

A Ni—B amorphous alloy catalyst supported on MgO was reported in Chin. J. Catal. 2005; 26(2): 91-2. This catalyst was prepared by a metal inductive electroless powder plating method. Ag/MgO was prepared as the precursor by an impregnation method, and then the supported Ni—B amorphous alloy catalyst was prepared by an electroless plating method. Ag can anchor the initial Ni—B around it on the support and thus effectively inhibits the NiB particles from aggregation. The size of NiB clusters of the catalysts was around 40 nm. Ni—B supported on MgO exhibits better catalytic performance when compared with the unsupported catalyst.

In CN1169975A, a supported amorphous alloy catalyst was disclosed. It was composed of 0.1-30% Ni—B amorphous alloy and the metal additive M, and 70.0-99.9% porous carrier material, based on the total weight of the catalyst. The atom ratio of Ni and M is 0.1-1000, the atomic ratio of (Ni+M) and B is 0.5-10.0, its specific surface area is 10-1000 m$^2$/g. The catalyst was prepared by contacting, at a temperature lower than 100° C., the porous material (containing of Ni and M with the atom ratio 0.1-80) with NH$_4^+$ solution at the mol concentration of 0.5-10.0 where the atom ratio of Ni to B is 0.1 to 10.0.

In CN 1286140A, a preparation method of a supported amorphous alloy catalyst composed of boron, nickel and the metal additive M was disclosed. The porous carrier material was impregnated in the solution with metal additive M, the product was dried and baked, and it was then impregnated with the solution containing nickel salt and dried. After that, the precursor was contacted with BH$_4^-$ solution with the mol concentration of 0.5-15.0% at 0-100° C.

In CN 1262147A, an amorphous Ni—B alloy supported on TiO$_2$ catalyst was disclosed. The catalyst was composed of Ni—B amorphous alloy and rare earth elements, TiO$_2$ was used as support. The content of Ni—B is 5.26%, and the content of rare earth elements is 1%, based on the total weight of the catalyst. The prepared catalyst possesses a very high catalytic activity at low temperatures and nearly 100% selectivity in hydrogenation of aromatic compounds, and it shows good performance in hydrogenation and desulfuration, so it could be used in the hydrogenation and refinement of petrol.

In CN 1546229A a preparation method of a supported amorphous alloy catalyst was disclosed. It was composed of transition inductive metal, amorphous Ni—B alloy and oxide or molecular sieve as catalyst supports. The content of amorphous Ni—B alloy was 5-50% based on the total weight of the catalyst, and the mol ratio of Ni to B was 70:30. The content of the inductive metal was 0.1-10% based on the total weight of the catalyst. The catalyst was prepared by contacting a precursor which contained inductive metal M with a stable electroless plating solution, the amorphous Ni—B alloy will deposit on the porous support directionally with the effect of inductive metal M. The prepared catalyst showed very high catalytic activity, good mechanical property with a low cost, and it was safe for use. The preparation method was easy to apply in the chemical industrial. The preparation process would be well controlled with good repeatability in industrial production. It showed good performance in hydrogenation of compounds having unsaturated functional groups.

The preparation of supported amorphous Ni—B alloy catalyst has progress from the traditional impregnated chemical reduction method (support was impregnated with nickel salt and metal additive M first, and then it was reduced by BH$_4^-$ after filtrated and dried) to the metal inductive electroless powder plating method (placing the carrier containing an inductive metal in the stable electroless plating solution containing a nickel salt and a reducing agent) which is capable of industrial-scale production (Laijun Wang et al., Chinese Journal of Catalysis, 2005, 26, 91), representing a big step forward in applying amorphous alloy catalysts in the chemical industry.

Sulfolane, or 2,3,4,5-Tetrahydrothiophene-1,1-dioxide, is a good solvent. Most of the organic compounds and polymers dissolve in sulfolane. In general, sulfolane is used for aromatic compound extraction, purification of the natural gas and refinery gases, desulfuration, and as a solvent for rubber and plastics. It also can be used in the printing process.

The industrial manufacture process of sulfolane was originally developed in England at 1940s, using butadiene and sulfuric dioxide as the starting materials. After making sulfolene by the Diels-Alder reaction, sulfolane can be obtained by hydrogenation of sulfolene at the presence of a catalyst containing nickel, which commonly is Raney Ni. Raney Ni, however, is not safe for use and it pollutes the environment. Thus, there is an urgent need to develop a novel, efficient, safe and environment friendly catalyst to replace Raney Ni.

SUMMARY OF THE INVENTION

One object of the present invention is to provide a supported amorphous Ni—B alloy catalyst, possessing high catalytic activity, good mechanical property, safe to use and easy to be separated from reactants and products. This and other objects of the present invention are realized by supporting said amorphous Ni—B alloy catalyst on an expanded graphite material. The expanded graphite, a novel carrier used for the first time as catalyst support, provides a good medium where the Ni—B clusters of the catalyst are well dispersed.

Another object of the present invention is to provide a preparation method of amorphous Ni—B alloy catalyst supported on expanded graphite, with easier applications in the industry, well controlled manufacturing process, repeatable product quality, and lower production costs.

A further object of the invention is the use of the amorphous Ni—B alloy catalyst supported on expanded graphite in the hydrogenation process of the chemical compounds having unsaturated functional groups. For example, the present invention provides a use of the prepared catalyst for hydrogenation of sulfolene at low temperatures yet with high catalytic activity.

As one particular embodiment, the invention provides a supported amorphous alloy catalyst, which comprises porous expanded graphite as carrier, an effective amount of Ni—B amorphous alloy, and a transition metal as induction agent. The size of the catalyst particles is 80-800 μm (preferably 200 μm). The atomic ratio of Ni to B is 0.1-10 and the diameter of Ni—B clusters is 10-100 nm, and the inductive transition metal is Pd or Ag. The content of said Ni—B amorphous alloy is from 5 to 50% of the total weight of the catalyst (wt/wt). The content of said inductive metal is from 0.1 to 10% of the total weight of the catalyst (wt/wt). The specific surface area of said expanded graphite is 10-100 m$^2$/g.

Another embodiment of the supported amorphous alloy catalyst of the present invention comprises porous expanded graphite as carrier, a Ni—B amorphous alloy, and a transition metal as induction agent. The size of catalyst particles is from 80-800 μm. The atomic ratio of Ni to B is 0.1-10 and the diameter of Ni—B clusters is 10-100 nm. The precursor of expanded graphite has undergone ultrasonic treatment in water for 10-180 minutes at 40 KHZ.

The various features of novelty which characterize the invention are pointed out with particularity in the claims annexed to and forming a part of this disclosure. For a better understanding of the invention, its operating advantages, and specific objects attained by its use, reference should be made to the drawings and the following description in which there are illustrated and described preferred embodiments of the invention.

DETAILED DESCRIPTION OF PARTICULAR EMBODIMENTS

Figure 1:
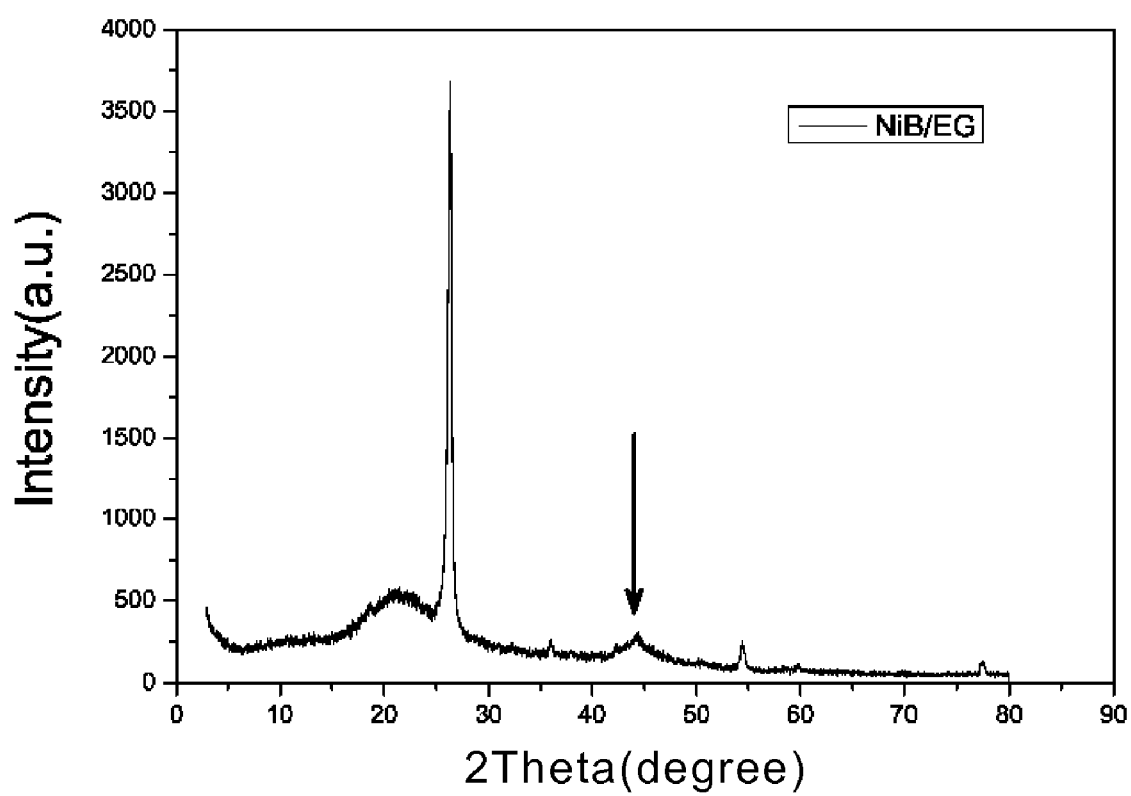
FIG. 1 shows the XRD graph of the amorphous Ni—B alloy catalyst supported on expanded graphite according to the present invention.

The detailed exemplary procedures for preparation of the supported catalyst of the present invention are described as follows:

1) Preparation of Expanded Graphite

Expanded graphite was prepared from flake graphite, potassium permanganate and sulfuric acid. They are mixed with the weight ratio of 1:0.2:6, and stirred for 30 minutes at 45° C. The mixture was then rinsed with water thoroughly to pH 7 and dried at 120° C. for 2 h, to afford a graphite material. To expend the graphite, it was subject to microwave radiation at a power of 750 W in a microwave oven for 10-15 seconds to obtain a worm-like expended graphite material. It was then crashed in water to particles, which were further filtrated, dried at 120° C., and then sieved to 80-800 μm for use.

2) Preparation of the Plating Solution

The electroless plating solution was prepared by mixing a nickel salt solution, complexing agent for $Ni^{2+}$ and a $KBH_4$ solution and the pH was adjusted with NaOH to pH 14. The atomic ratio Ni/B in the solution should be within the range of 0.1-10. The mole ratio of complexing agent to $Ni^{2+}$ should be within the range of 2-6.

3) Preparation of the Precursor

The transition metal as induction agent was supported on expanded graphite by an impregnation method to afford a precursor for electroless plating. The content of the transition metal should be from 0.1 to 10% of the total weight of the precursor (wt/wt).

4) Metal Inductive Electroless Powder Plating

To obtain the catalyst, the prepared precursor was mixed with the electroless plating solution with stirring at 0-90° C., most preferably, 45° C. After 10-100 minutes, the product was washed with distilled water to pH 7 and then thoroughly rinsed with absolute alcohol. The resulting catalyst can be dried for storage. It can also be stored in absolute alcohol.

The precursor in step 3) may be optionally treated by ultrasonic radiation in water for 10-180 minutes at 40 KHZ.

The soluble nickel salt can be one or more selected from the group comprising nickel dichloride, nickel sulfate, nickel nitrate and nickel acetate, preferably nickel sulfate.

The complexing agent for $Ni^{2+}$ can be one or more selected from the group comprising acetic acid, citric acid, ammonia, ethylenediamine and sodium tartrate, preferably ammonia or ethylenediamine.

As a particular example, the prepared Ni—B amorphous alloy catalyst supported on expanded graphite in the invention was tested with hydrogenation of sulfolene to sulfolane. The hydrogenation process is described as follows.

In the presence of the catalyst, dissolve sulfolene in a solvent and perform the hydrogenation reaction in an autoclave under the following conditions: the weight ratio of sulfolene to catalyst being 20-100:1; the weight ratio of solvent to sulfolene being 0.5-2:1; the hydrogen gas under pressure of 2.5-3.0 MPa; the reaction temperature being 308-333 K; the rate of stir being 500-900 rpm; the reaction duration being 1-3 hours. Upon completing the process, analyze the products using a gas chromatograph to find out the sulfolane yield.

According to the present invention, the amorphous Ni—B alloy catalyst supported on expanded graphite shows high catalytic activity in catalyzing the sulfolene hydrogenation process. The prepared catalyst achieves the goal of being high catalytic activity, good mechanical properties (with Ni—B well dispersed), suitable for low cost and large scale production, and safe to use.

EXAMPLES

The following examples are given only for illustration of the present invention. It should be stressed that the present invention is not limited by these examples.

Example 1

Expanded graphite was prepared from flaky graphite, potassium permanganate and sulfuric acid. 10.0 g flaky graphite with particle sizes around 200 μm, 2.0 g potassium permanganate and 60.0 g sulfate acid were mixed in a 100 ml flask at 45° C., stirring for 30 minutes. It was then filtered, washed with water to pH 7 and dried at 120° C. The filtrate was subject to microwave radiation (at 750 W) in a microwave oven for 15 second to obtain worm-like expanded graphite material, which was then added to boiling water under vigorous stirring for about 2 hours or until the expanded graphite crashed into small particles. The EG particles were sieved to around 200 μm and ready for use. Of course, the conditions and parameters specified above can be modified by people skilled in the art and still be able to achieve satisfactory results.

5.0 g expanded graphite particles as prepared above was placed in 100 ml water containing 0.016 g silver nitrate, soaked with vigorous stirring for 2.0 hours, then filtrated and dried at 120° C. to obtain the precursor $Ag_2O/EG$. 2.3 g of the precursor were subject to ultrasonication for 40 minutes in a flask with 100 ml water, using an ultrasonic generator (VWR AQUASONIC 150D, 38.2~40.2 kHz) and then added into a electroless plating solution, which contained: $NiSO_4 \cdot 6H_2O$ (2.697 g), $NH_2CH_2CH_2NH_2$ (2.47 g), NaOH (6.9 g) and $KBH_4$ (0.836 g), in distilled water (240 ml), allowing the planting process proceed with stirring for about 0.5 hour. After the plating was complete, the product was washed with distilled water and then absolute alcohol, and dried for storage. The diameter of Ni—B/EG catalysts particles so obtained was about 200 μm, with a BET specific surface area of 35.4 m$^2$/g, measured by a nitrogen adsorption method.

Figure 2:
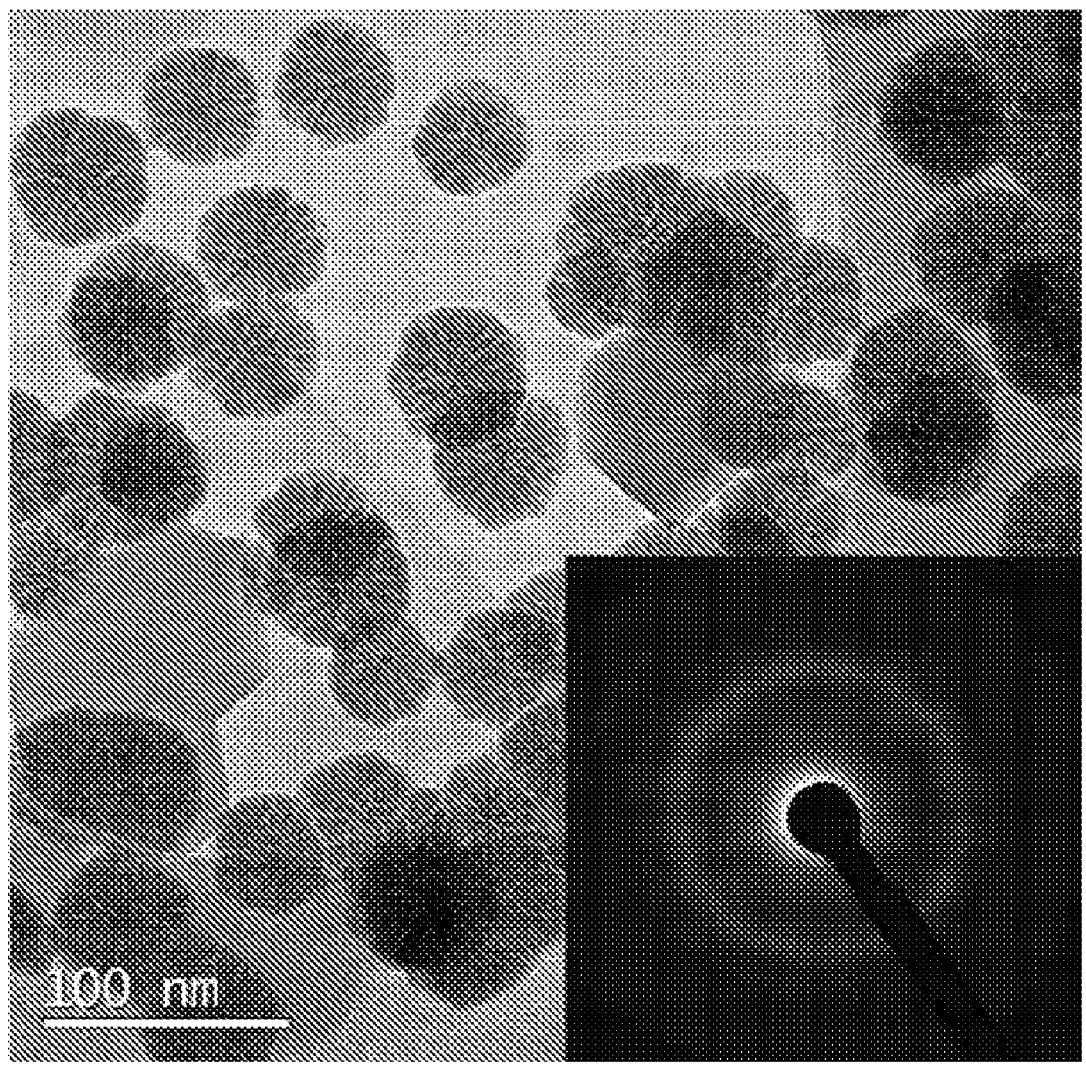
FIG. 2 shows the TEM micrograph and SAED image of Ni—B of amorphous Ni—B alloy catalyst supported on expanded graphite.
Figure 3:
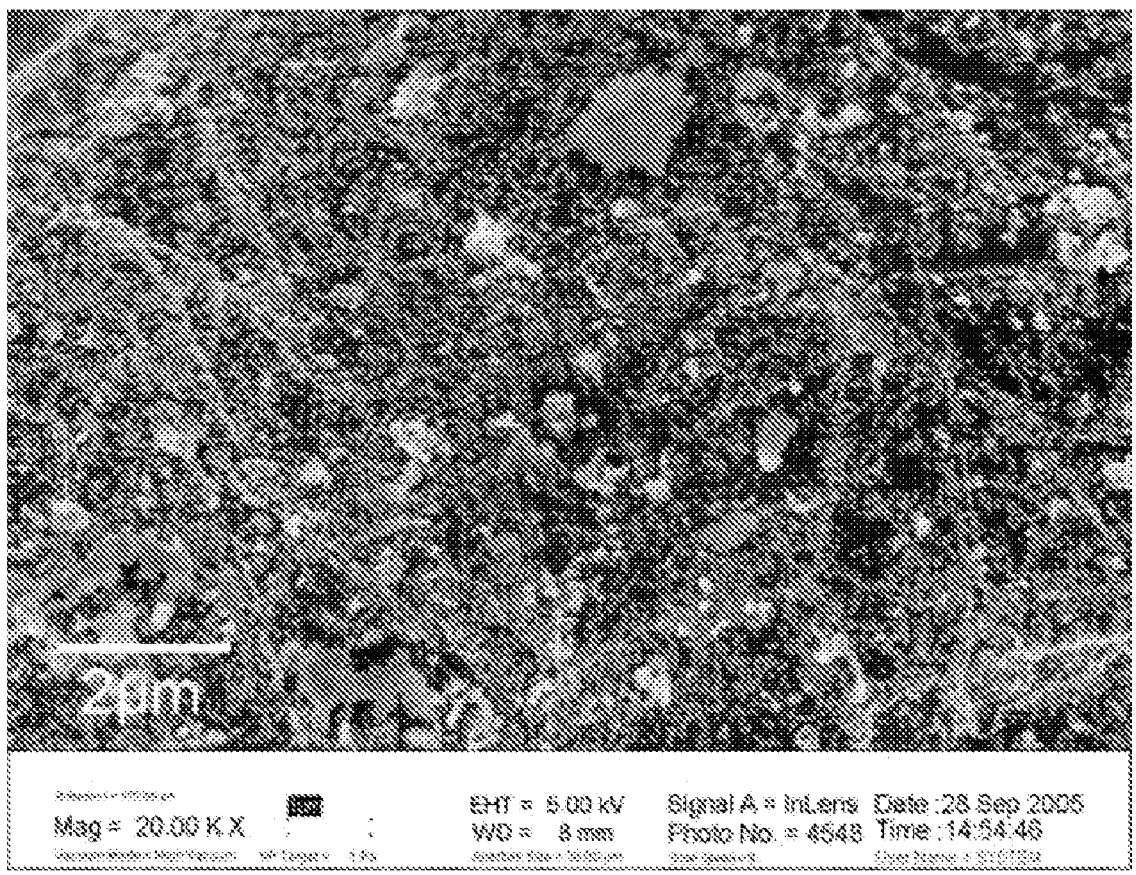
FIG. 3 shows the SEM micrograph of amorphous Ni—B alloy catalyst supported on expanded graphite.

The Ni—B/EG catalysts were further characterized by X-ray Diffraction (XRD), field emission scanning electronic microscopy (SEM), high resolution transmission electron microscope (HRTEM), and selected area electron diffraction (SAED). The results confirmed the amorphous structure of Ni—B alloy, showing that the Ni—B clusters were well-distributed on EG in a single layer and the size distribution was homogeneous. They were a snowflake-like material, with the average size around 10-100 nm, which could be controlled to achieve a desired narrower range. FIG. 1 shows the XRD graph. FIG. 2 shows the TEM and SAED micrograph. The halo in the SAED photo (FIG. 2) and the broad peak around 2θ=45° observed in the XRD graph (FIG. 1) indicates the amorphous structure of Ni—B alloy. The TEM micrograph shows that the average size of the Ni—B clusters is around 40 nm. FIG. 3 shows that the Ni—B clusters are well-distributed on EG in a single layer, and the size distribution is homogeneous.

The catalytic activity of the prepared catalyst was tested with the hydrogenation process by which sulfolene became sulfolane. The hydrogenation of sulfolene was performed at 318 K and 2.5 MPa of hydrogen pressure in a 100 mL stainless autoclave, which contains 0.6 g catalyst, 30 g sulfolene and 30 ml distilled water. The mixture was stirred at 800 rpm for 2.5 hours. The reaction products were analyzed by a gas chromatograph (GC 7800, Rock Analytical Instruments Co. Ltd., Shandong, China) with a flame ionization detector (FID), to find out the yield of sulfolane. The result is presented in Table 1.

Comparative Example 1a

Raney-Ni was used with the same process as described in Example 1 as a comparative catalyst. The hydrogenation reaction was carried out under the same condition as described in example 1. Specifically, 0.75 g Raney Ni (wet weight, meaning 0.6 g dry weight) was added to the reactants. The result is shown in Table 1. The process of the hydrogenation is shown in FIG. 4.

Comparative Example 1b

Ni—B/MgO (also prepared by metal inductive electroless powder plating method) was used in the sulfolene hydrogenation process as described in Example 1 for another comparative study. The result is presented in Table 1. The process of hydrogenation is shown in FIG. 4.

Figure 4:
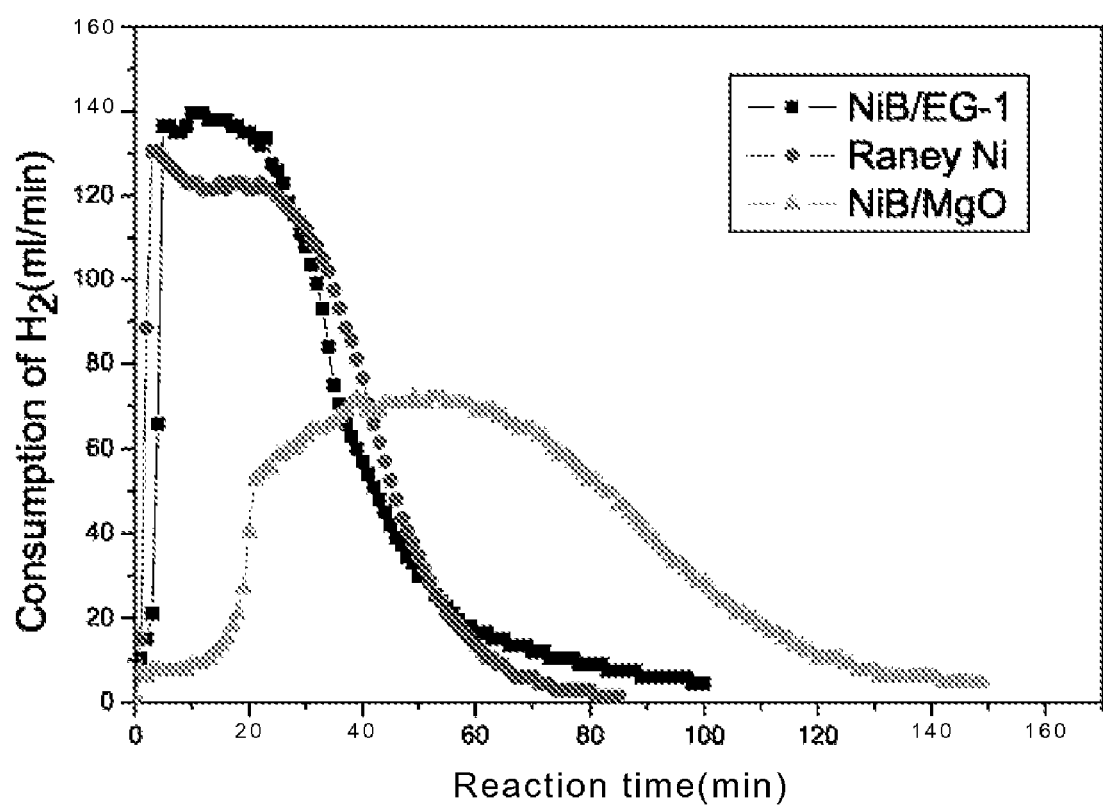
FIG. 4 shows the hydrogenation process catalyzed by amorphous Ni—B alloy supported on expanded graphite catalyst, amorphous Ni—B alloy supported on MgO catalyst and Raney Ni catalyst, respectively.

As shown in FIG. 4, at low temperatures, the catalytic activity of Ni—B/EG-1 (i.e., the catalyst of the present invention with Ni loading of 14.2%) is higher than that of Raney-Ni, and is obviously higher than that of Ni—B/MgO with Ni loading of 15.3%.

Example 2

The precursor Ag$_2$O/EG prepared in Example 1 was added into the electroless plating solution directly without being further treated with ultrasonication. The plating solution is 340 ml. The other steps were the same as those described in Example 1. The hydrogenation result is presented in Table 1.

Example 3

The composition of the electroless plating solution was changed as follows: 1.32 g NH$_2$CH$_2$CH$_2$NH$_2$, 1.440 g NiSO$_4$.6H$_2$O, 3.7 g NaOH, 0.451 g KBH$_4$, and 90 ml distilled water. The other steps were the same as those described in Example 2. The hydrogenation result is presented in Table 1.

Example 4

The composition of the electroless plating solution was changed as follows: 1.85 g NH$_2$CH$_2$CH$_2$NH$_2$, 2.022 g NiSO$_4$.6H$_2$O, 5.2 g NaOH, 0.627 g KBH$_4$, 130 ml distilled water. The other steps were the same as those described in Example 3. The hydrogenation result is presented in Table 1.

Example 5

The catalytic activity of the catalyst prepared in Example 1 was tested with the hydrogenation of sulfolene to sulfolane. The hydrogenation of sulfolene was performed in the solution under stirring at 600 rpm for 2.5 hours, and the other conditions were the same as those described in Example 1. The result is presented in Table 1.

TABLE 1

Yields of 2,3,4,5-Tetrahydrothiophene-1,1-dioxide with various catalysts

| | catalysts | Composition (atom ratio) | Ni wt(%) | Stir (r/min) | yield (%) |
|---|---|---|---|---|---|
| example 1 | Ni-B/EG-1 | Ni$_{78.9}$B$_{21.1}$ | 14.2 | 800 | 98.1 |
| Comparative example 1 | Raney Ni | | 100 | 800 | 97.7 |
| Comparative example 2 | Ni-B/MgO | Ni$_{71.3}$B$_{28.7}$ | 15.3 | 800 | 97.1 |
| example 2 | Ni-B/EG-2 | Ni$_{69.7}$B$_{30.3}$ | 13.5 | 800 | 85.5 |
| example 3 | Ni-B/EG-3 | Ni$_{59.9}$B$_{40.1}$ | 8.5 | 800 | 72.4 |
| example 4 | Ni-B/EG-4 | Ni$_{68.7}$B$_{31.3}$ | 10.7 | 800 | 77.0 |
| example 5 | Ni-B/EG-5 | Ni$_{78.9}$B$_{21.1}$ | 14.2 | 600 | 81.5 |

While there have been described and pointed out fundamental novel features of the invention as applied to a preferred embodiment thereof, it will be understood that various omissions and substitutions and changes, in the form and details of the embodiments illustrated, may be made by those skilled in the art without departing from the spirit of the invention. The invention is not limited by the embodiments described above which are presented as examples only but can be modified in various ways within the scope of protection defined by the appended patent claims.

What is claimed is:

1. A Ni—B catalyst, comprising (a) an amorphous Ni—B alloy forming a plurality of Ni—B clusters; (b) a transition metal, and (c) an expanded graphite particle, wherein said amorphous Ni—B clusters and said transition metal are supported on said expanded graphite particle after undergoing a metal inductive electroless plating process and said expanded graphite particle is of 80-800 μm in diameter.

2. The Ni—B catalyst of claim 1, wherein said Ni—B clusters are 10-100 nm in size.

3. The Ni—B catalyst of claim 1, wherein atomic ratio of Ni/B is in the range from 0.1 to 10.

4. The Ni—B catalyst of claim 1, wherein said transition metal is Ag.

5. The Ni—B catalyst of claim 1, wherein said Ni—B amorphous alloy accounts for 5 to 50% by weight.

6. The Ni—B catalyst of claim 5, where said transition metal accounts for 0.1 to 10% by weight.

7. The Ni—B catalyst of claim 1, wherein said expanded graphite particle has a specific surface area within a range of 10 to 100 m$^2$/g.

8. A method of making a Ni—B catalyst of claim 1, comprising the steps of: (a) preparing expanded graphite particles; (b) preparing a plating solution from a nickel salt, a complexing agent for $Ni^{2+}$ and a potassium tetrahydroborate; (c) supporting a transition metal on said expanded graphite particles to obtain a precursor; and (d) placing said precursor in said plating solution to perform metal inductive electroless powder plating to afford a Ni—B catalyst supported on said expanded graphite particles.

9. The method of claim 8, wherein step (a) comprises mixing flaky graphite, potassium permanganate and sulfuric acid to obtain a mixture; subjecting said mixture to microwave radiation to obtain expanded graphite; and crashing said expanded graphite into particles.

10. The method of claim 8, wherein step (b) comprises mixing a solution of a nickel salt, complexing agent for $Ni^{2+}$ and potassium tetrahydroborate solution, with pH being adjusted to 14, where atomic ratio of Ni to B is 0.1-10 and mole ratio of said complexing agent to $Ni^{2+}$ is 2-6.

11. The method of claim 8, wherein in step (c) said precursor comprises 0.1-10% said transition metal by weight.

12. The method of claim 8, wherein in step (d) said precursor is placed in said electroless plating solution with stirring at a temperature between 0-90° C. for 10-100 minutes.

13. The method of claim 12, wherein said temperature is between 40-50° C.

14. The method of claim 9, wherein said expanded graphite particles are sieved to 80-800 μm.

15. The method of claim 8, wherein said precursor is treated by ultrasonic radiation for 10-180 minutes at 40 KHZ.

16. The method of claim 8, wherein said nickel salt is selected from the group consisting of nickel dichloride, nickel sulfate, nickel nitrate and nickel acetate.

17. The method of claim 16, wherein said nickel salt is nickel sulfate.

18. The method of claim 8, wherein said complexing agent for $Ni^{2+}$ is selected from the group consisting of acetic acid, citric acid, ammonia, ethylenediamine and sodium tartrate.

* * * * *